(12) United States Patent
Harrington (10) Patent No.: US 7,024,506 B1
(45) Date of Patent: Apr. 4, 2006

(54) HIERARCHICALLY EXPANDABLE FAIR ARBITER

(75) Inventor: Drew Harrington, Hayward, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 310 days.

(21) Appl. No.: 10/330,589

(22) Filed: Dec. 27, 2002

(51) Int. Cl.
*G06F 12/08* (2006.01)
*H04L 12/40* (2006.01)

(52) U.S. Cl. .................. 710/243; 710/108; 710/110; 370/438; 370/449

(58) Field of Classification Search ............... 710/244, 710/243, 242, 119, 113, 112, 111, 107, 108, 710/240; 711/151; 370/418, 412, 395.4, 370/438, 449; 709/253, 223; 340/825.5
See application file for complete search history.

(56) References Cited

U.S. PATENT DOCUMENTS

| | | | | |
|---|---|---|---|---|
| 4,473,880 A | * | 9/1984 | Budde et al. ............... 710/112 |
| 4,602,327 A | * | 7/1986 | LaViolette et al. .......... 710/107 |
| 4,667,192 A | * | 5/1987 | Schmid et al. ........... 340/825.5 |
| 4,851,996 A | * | 7/1989 | Boioli et al. ................ 710/242 |
| 5,237,696 A | * | 8/1993 | Best ........................... 710/119 |
| 5,519,837 A | * | 5/1996 | Tran ........................... 710/111 |
| 5,666,488 A | * | 9/1997 | Joh ............................. 709/253 |
| 5,796,968 A | * | 8/1998 | Takamiya .................... 710/113 |
| 5,862,353 A | * | 1/1999 | Revilla et al. ............... 710/107 |
| 5,884,051 A | * | 3/1999 | Schaffer et al. ............. 710/107 |
| 6,111,886 A | * | 8/2000 | Stewart ....................... 370/438 |
| 6,189,060 B1 | * | 2/2001 | Kodama ...................... 710/108 |
| 6,249,847 B1 | * | 6/2001 | Chin et al. .................. 711/151 |
| 6,311,249 B1 | * | 10/2001 | Min et al. ................... 710/111 |
| 6,385,678 B1 | * | 5/2002 | Jacobs et al. ............... 710/113 |
| 6,487,213 B1 | * | 11/2002 | Chao .......................... 370/418 |
| 6,556,571 B1 | * | 4/2003 | Shahrier et al. .......... 370/395.4 |
| 6,880,028 B1 | * | 4/2005 | Kurth .......................... 710/240 |
| 6,907,458 B1 | * | 6/2005 | Tomassetti et al. ......... 709/223 |
| 2002/0176431 A1 | * | 11/2002 | Golla et al. ................. 370/412 |
| 2003/0188065 A1 | * | 10/2003 | Golla et al. ................. 710/243 |
| 2004/0103231 A1 | * | 5/2004 | Zhu ............................ 710/113 |
| 2004/0103232 A1 | * | 5/2004 | Clayton ...................... 710/244 |

* cited by examiner

*Primary Examiner*—Glenn A. Auve
*Assistant Examiner*—Christopher E. Lee (57) ABSTRACT

A plurality of arbitration devices is hierarchically coupled and has a plurality of child devices and at least one parent device. Each of the plurality of arbitration devices is operable to store a previous arbitration winner. In addition, the plurality of arbitration devices is operable to generate a request-out signal based on a plurality of request-in signals, and is operable to generate a select-out signal from a select-in signal, a plurality of request-in signals and from the previous arbitration winner. The request-out signals of the plurality of child devices are coupled to request-in signals of their respective parent devices and select-in signals of the child devices are received from select-out signals of the respective parent devices. Access is granted by a select-out signal from a device of the plurality of arbitration devices that resides at the lowest level of the system.

17 Claims, 5 Drawing Sheets

HIERARCHICALLY EXPANDABLE FAIR ARBITER

BACKGROUND OF THE INVENTION

1. Field of the Invention

The present invention relates to the field of computer system arbitration. More particularly, the present invention relates to an arbitration circuit that provides fair arbitration between a number of requestors and that provides input/output (I/O) to allow hierarchical cascading.

2. Related Art

The bus architecture of a computer system substantially influences the manner in which information is communicated between the components of a computer system. In a typical computer system, one or more buses are used to connect a central processing unit (CPU) to a memory and to input/output elements. Typically, the bus consists of several "lines" of electrically conductive material. The bus permits electrical signals representing data and control instructions to be readily transmitted between different components coupled to the bus. The order and speed at which the components interact with each other over the bus has a substantial impact on the performance of the computer system.

In accordance with industry standard, only one data transaction can take place on a bus at any given time. To ensure this requirement is enforced, the typical bus system has an arbiter that controls access to the bus. When an agent or device wishes use of the bus to transmit or receive data, the agent requests bus "ownership" from the arbiter. The agent requesting ownership is referred to as an initiator agent or master device. The term master device is generally used throughout all bus systems. The agent with whom the initiator agent is attempting to communicate is referred to as a target agent or slave device. The term slave device is used generally throughout all bus systems.

Typically, each of the agents or devices may independently act as an initiator and request bus ownership. Thus, at any given time several of the agents may be requesting bus ownership simultaneously. Where there are simultaneous requests for bus ownership, an arbiter is employed to arbitrate among requesting initiator agents, or master devices, to determine which one may be granted bus ownership.

In the case of typical arbitration, a priority system is set up. Each device wishes ownership of the bus in accordance with its respective requirements. These requirements may include, for example, latency tolerance, data transfer bandwidth, block transfer size, and the like. Each device should have a differing priority status with regard to their respective requests for bus ownership. Some devices are more critical to the proper operation of the computer system than others, some are less tolerant of latency than others, and some devices need to transfer very large quantities of data. If the arbiter grants access in an erratic or arbitrary manner, there is no assurance that the computer system will operate effectively. However, if devices with more critical requirements are assured a better chance of obtaining bus access, the computer system will operate more efficiently. Thus, the order in which master devices access a bus is very important and often critical to the optimal operation of the computer system. Typically, the order in which devices access a bus is set forth in an arbitration priority scheme.

Despite the potential benefits of a priority arbitration system, it has several flaws. When any other device requests bus ownership simultaneously with another device, the device with highest priority always wins and receives ownership first. Lower priority devices may not be granted sufficient access to the bus because they can be prevented from acquiring ownership for long periods of time. That is, lower priority devices may be "starved" of bus access, especially in a system where there are many high priority devices. Hence, a priority arbitration scheme does not ensure low priority devices may be granted adequate bus access.

Given that the priority arbitration scheme is typically based on the respective requirements of devices in the computer system, the most efficient arbitration priority arbitration scheme is not ascertainable until after the devices of a particular computer system are designed and their requirements ascertained. Previously, an optimal design for the PCI arbiter could not be accomplished until after the master devices and slave devices of a particular computer system were designed. Thus, engineering resources committed to the arbiter design are essentially "on hold" until after the rest of the computer system is designed. In addition, waiting to design the arbiter means that there are significant delays in production of the final product and in realizing the advantages associated with new computer designs.

Other arbitration schemes, such as "round robin" schemes, in which access is granted on a rotating, first-come, first-served basis, exist. The round robin scheme is usually best used in a system where all master devices perform tasks that are of equal priority and in which the servicing of events can be arbitrarily started and stopped without a problem. Each of the existing schemes has its advantages and disadvantages, depending on application.

As chip designs evolve and the number of transistors on a chip increases, whole systems are being designed on a single chip. Most processing elements in a system-on-a-chip communicate with each other via buses and memory. As the number of bus masters increases and fluctuates in a single chip, powerful arbitration that is efficient and scalable is becoming of greater and greater importance.

SUMMARY OF THE INVENTION

Accordingly, embodiments of the present invention provide a device and method for granting access to a resource in a fair and scalable manner. A plurality of arbitration devices for granting access to a resource is disclosed. The plurality of arbitration devices is hierarchically coupled and has a plurality of child devices and at least one parent device. Each of the plurality of arbitration devices is operable to store a previous arbitration winner. In addition, the plurality of arbitration devices is operable to generate a request-out signal based on a plurality of request-in signals, and is operable to generate a select-out signal from a select-in signal, a plurality of request-in signals and from the previous arbitration winner. The request-out signals of the plurality of child devices are coupled to request-in signals of their respective parent devices and select-in signals of the child devices are received from select-out signals of the respective parent devices. Access is granted by a select-out signal from a device of the plurality of arbitration devices that resides at the lowest level of the system.

In one embodiment, the plurality of arbitration devices comprises a hierarchical system that is binarily expandable. The system is configurable to receive an input hold signal, the input hold signal causing the access to be held for a specified number of clock cycles. The plurality of arbitration devices is also configurable to generate a collision detection output signal.

BRIEF DESCRIPTION OF THE DRAWINGS

The accompanying drawings, which are incorporated in and form a part of this specification, illustrate embodiments of the invention.

DETAILED DESCRIPTION OF THE EMBODIMENTS

In the following detailed description of the embodiments, numerous specific details are set forth in order to provide a thorough understanding of the present invention. However, it should be recognized by one skilled in the art that the present invention may be practiced without some specific details or with equivalents thereof. In other instances, well-known methods, procedures, components, and circuits have not been described in detail as not to unnecessarily obscure aspects of the embodiments.

As the era of a billion transistors on a single chip approaches, more and more processing elements (PEs) are being placed on a system-on-a-chip (SoC). Most processing elements in an SoC communicate with each other via buses and memory. As the number of bus masters increases and fluctuates in a single chip, powerful arbitration that is efficient and that can be scaled from a small number to a very large number of requesters is becoming desirable.

Figure 1:
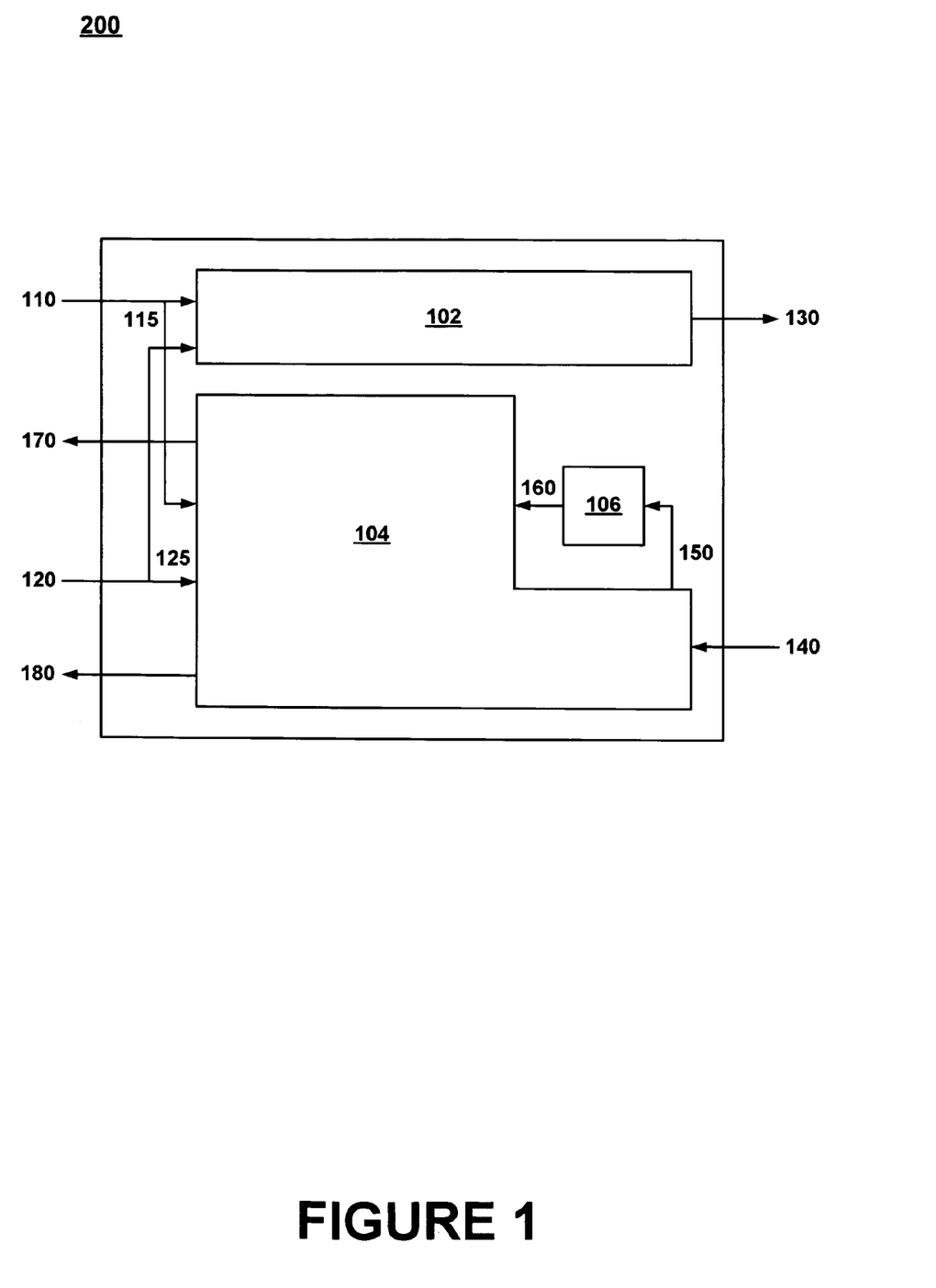
FIG. 1 is a block diagram illustrating an overview of the main elements of a fair arbiter device in accordance with one embodiment.

Accordingly, embodiments of the present invention provide a device and method for granting access to a resource that allow automated scaling and are efficient over a wide range of sizes. A plurality of arbitration devices for granting access to a resource is disclosed. FIG. 1 is a block diagram illustrating an overview of elements of a fair arbiter device 200 in accordance with one embodiment. According to one embodiment, an arbiter is fair if, for "n" requests being made simultaneously, it takes no more than "n" arbitration cycles for all "n" requests to be granted.

The device portrayed by FIG. 1 is a fair arbiter circuit according to an embodiment of the present invention. The basic functionality of circuit 200 is that of a binary device having two request inputs 110, 120 and two select outputs 170, 180 in accordance with one embodiment. When either of the two request inputs 110, 120 is asserted, one of the two select outputs 170, 180 may be asserted to grant access to a shared resource (e.g., a bus in a computer or on a computer chip) to a requestor, provided that a select in signal 140 is present. It should be appreciated that device 200 may be configured to have more than two input request signals.

Block 102 represents an element of device 200 that generates a request-out signal 130 based in the receipt of request-in signals 110 and/or 120. Request-out signal 130 may, according to one embodiment, be coupled to a request-in signal to a parent device in a hierarchical configuration, or, in the case of a single device or of an ultimate parent in a hierarchical configuration, request-out signal 130 may be coupled to select-in signal 140.

Block 106 of FIG. 1 illustrates a memory element of device 200 that is configured to hold the current state, representing which of the request inputs 110, 120 was the winner of the previous arbitration cycle. According to one embodiment, memory element 106 may be a D flip-flop device. In another embodiment, memory element 106 may be a latch or another type of flip-flop. Memory element 106 may be any device that could hold the state representing the winner of the previous arbitration cycle. The memory element 106 outputs memory signal 160 to block 104, such that block 104 may fairly determine the winner of the present arbitration cycle.

Block 104 of FIG. 1 portrays an element of device 200 that, according to one embodiment, receives select-in signal 140 and determines the winner of the present arbitration cycle, based on request signals 110 and 120, and the current state of memory signal 160. The winner becomes either select-out signal 170 or 180. Select out signals 170 and 180 may be configured to access a shared resource according to one embodiment. Select-out signals 170 and 180 may be configured to become a select-in signal for a child device in another embodiment in which device 200 is part of a hierarchical configuration. Block 104 also outputs signal 150 to the memory element 106. Signal 150 is based on the winner of the present arbitration cycle.

Memory element 106 receives the signal 150 from block 104, but does not immediately change its memory signal 160. For example, memory element 106 may be clocked (not shown), wherein its memory signal 160 changes at the next clock cycle to reflect the signal 150 from block 104. Thus, memory element 106 sends its current state in the form of memory signal 160 to element 104 and generates an updated current state for a next arbitration cycle.

Figure 2:
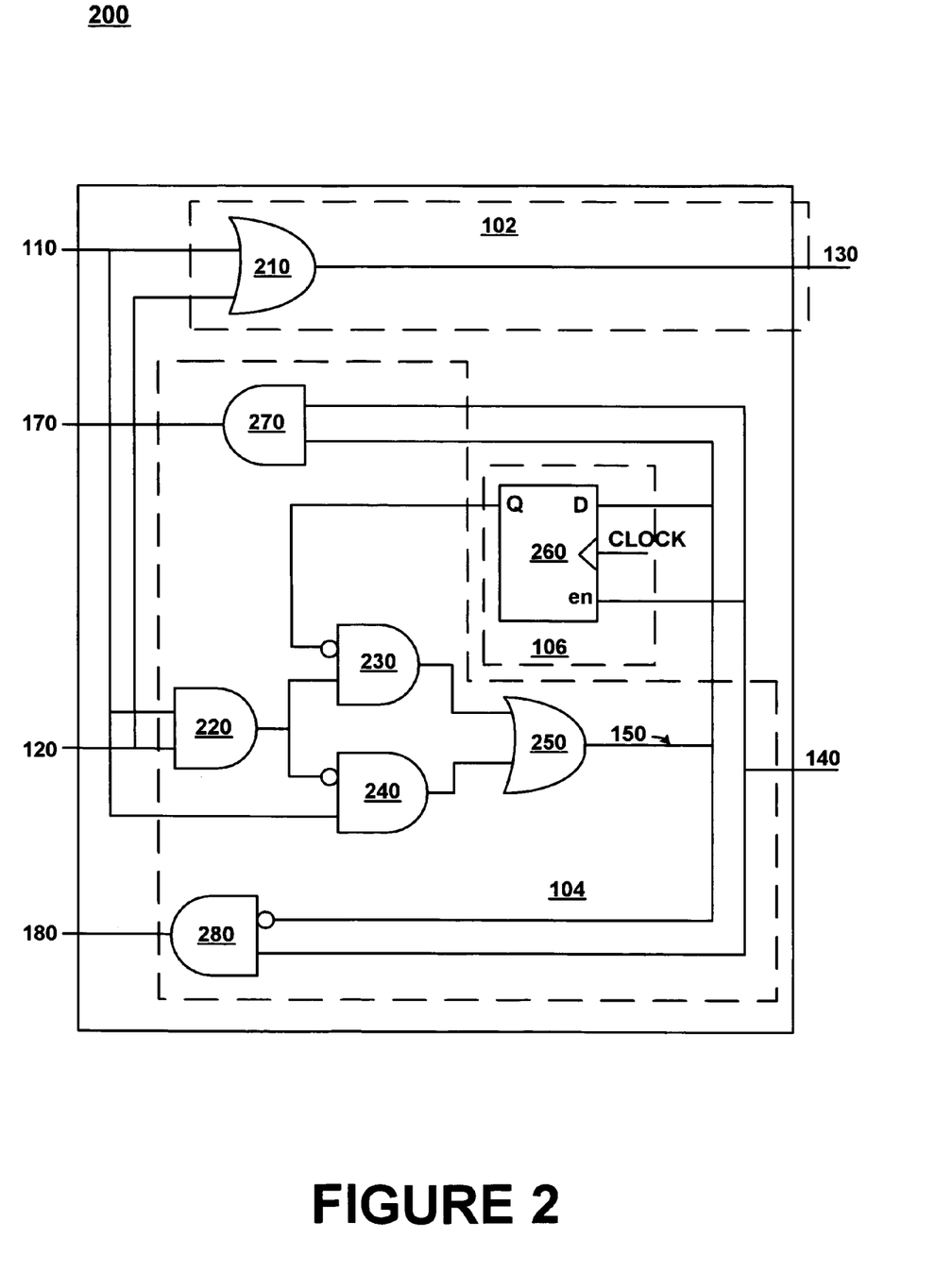
FIG. 2 is a diagram illustrating a fair arbiter device in accordance with one embodiment.

FIG. 2 is a diagram illustrating further details of fair arbiter circuit 200 in accordance with one embodiment. In one implementation, fair arbiter circuit 200 has two request-in signals, 110 and 120. Element 102 of device 200 has both request-in signals 110 and 120 input to OR gate 210 and if either of request-in signals 110 or 120 is asserted, request-out signal 130 is asserted.

Request-out signal 130 may, according to one embodiment, become select-in signal 140. This occurs when circuit 200 stands alone or is the most top level parent device when circuit 200 is configured in a hierarchical scheme in which cases there is no parent device to return a select-in signal. In another embodiment, request-out signal 130 may become a request-in (e.g., request-in signals 110 and 120) for a parent circuit in a hierarchical configuration. Request-in signals 110 and 120 also enter into logic element 104 comprising AND gates 220, 230 and 240 and OR gate 250. This logic in element 104 interfaces with memory device 260 of element 106 to determine ownership of requested access to a shared resource. Select-in signal 140 and the output signal 150 of OR gate 250 provide input to AND gates 270 and 280 to generate select-out signal 170 or 180, the winner of the current arbitration cycle. It should be noted that, if request-in 110 and request-in 120 arrive simultaneously, the winner, either select-out 170 or select-out 180, is the one that did not win the previous cycle.

Select-out signal 170 and 180 may be configured to directly access a shared resource, according to one embodiment. Select-out signals 170 and 180 may be configured to become select-in signals for child devices in another embodiment in which circuit 200 is part of a hierarchical configuration.

Although circuit 200 is shown to have two request-in and two select-out signals, it is understood that circuit 200 may be configured for more than two request-in and select-out signals. As shown, circuit 200 may stand alone or it may be expanded binarily. It should be understood that with minor changes in configuration, circuit 200 may be trinarily expandable or quadruply expandable, or expandable by any number of request-in and select out signals as is deemed reasonable and fitting.

Figure 3:
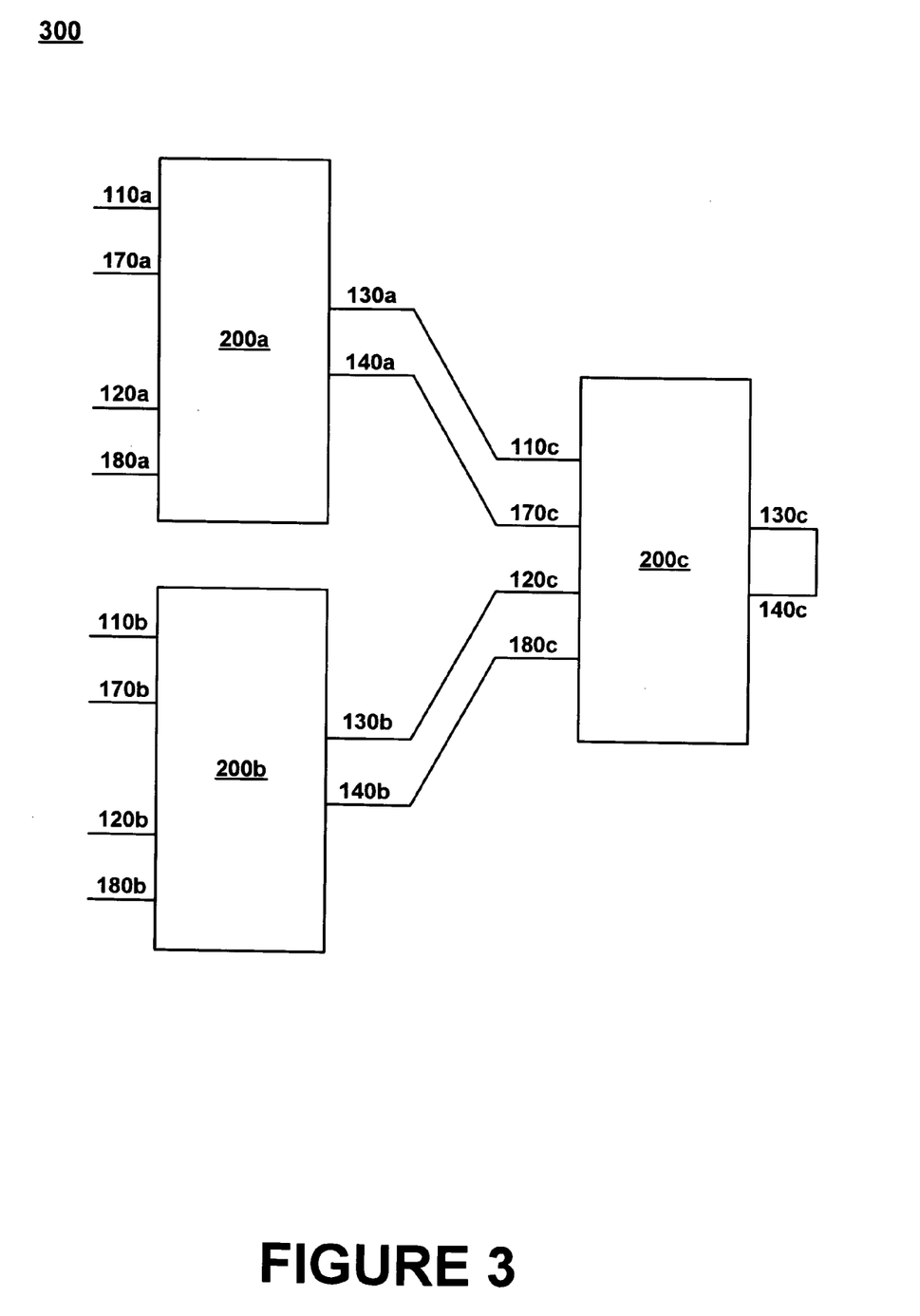
FIG. 3 is a block diagram of a hierarchical fair arbiter in accordance with one embodiment.

FIG. 3 is a block diagram of a hierarchical fair arbiter 300 in accordance with one embodiment. In the present embodiment, one parent device 200c and two child devices 200a and 200b are shown. Devices 200a, 200b and 200c may be fair arbiter circuits such as fair arbiter circuit 200 of FIG. 1 or FIG. 2.

Request-in signals 110a and 120a of child device 200a generate request-out signal 130a. Request-out signal 130a becomes request-in signal 110c to parent device 200c. Likewise, request-in signals 110b and 120b of child device 200b generate request-out signal 130b. Request-out signal 130b becomes request-in signal 120c to parent device 200c. Request-in signals 110c and 120c to parent device 200c generate request-out signal 130c. As device 200c is the ultimate parent device, that is, device 200c is the oldest generation and has no parent, request-out signal 130c is selected and becomes select-in signal 140c.

Still referring to FIG. 3, select-in signal 140c, in conjunction with request-in signals 110c and 120c, and with a memory element (e.g., memory device 260 of FIG. 2) generate a select-out signal that may be either select-out 170c or select-out 180c. If both request-in 110c and 120c were received simultaneously, the select-out would be whichever of 170c and 180c did not win access at the previous arbitration cycle.

If the winning select-out is 180c, it then becomes the select-in 140b to device 200b. Then, if both request-in 110b and request-in 120b were received simultaneously, the select-out would be whichever of 170b and 180b did not win previously. Access to the resource is granted to the child at the lowest level of the hierarchy, such as 200a, via its select-out (either 170a or 180a, whichever won). And so the logic may be propagated up and down the hierarchy for as many generations as exist.

It is understood that, although only two generations are described in the embodiment of FIG. 3, there may be multiple generations connected similarly so as to be scalable up or down according to the number of requestors in a system.

Figure 4:
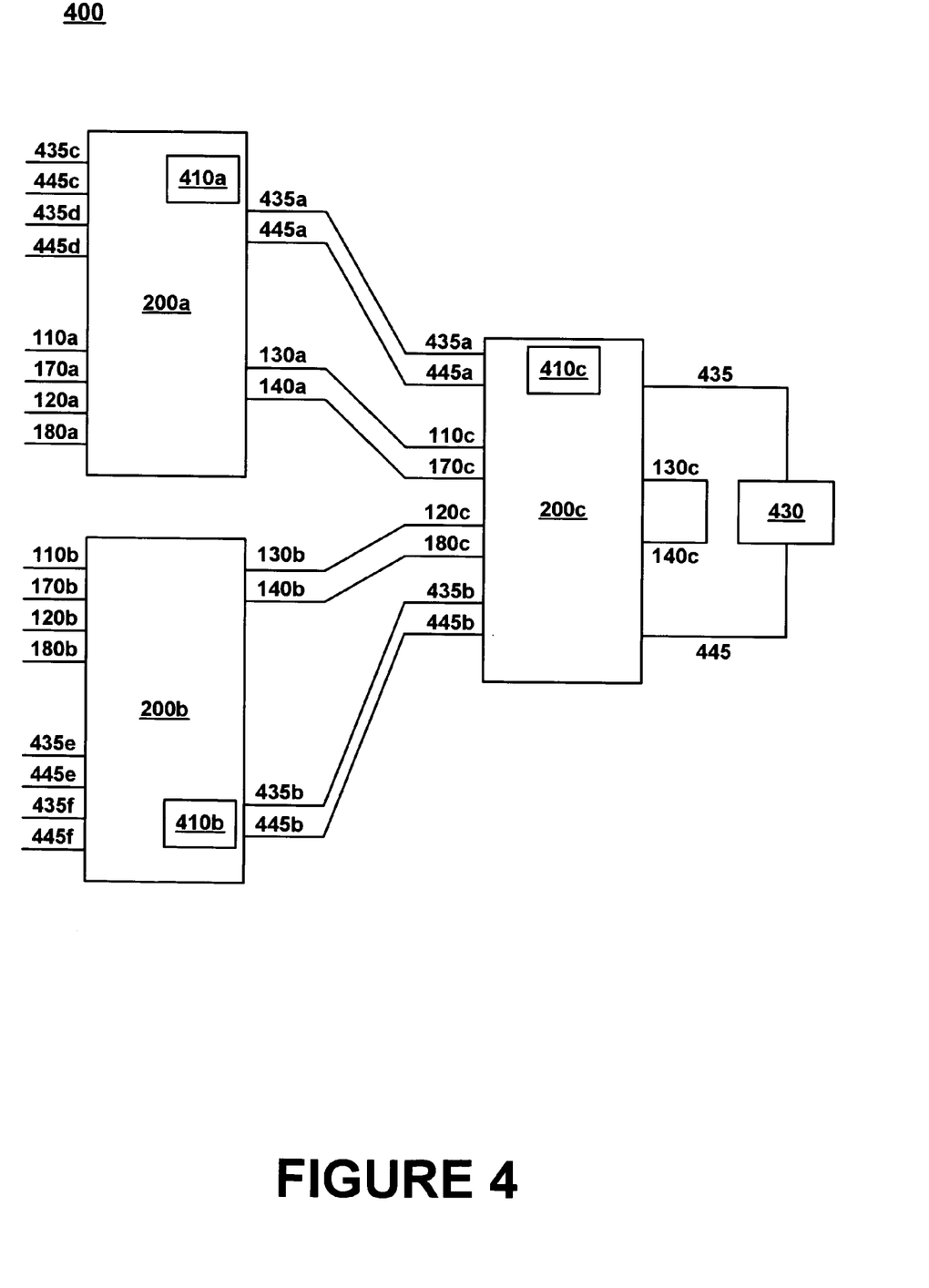
FIG. 4 is a block diagram of a hierarchical fair arbiter having an input hold function and a collision detection function, according to one embodiment.

FIG. 4 is a block diagram of a hierarchical fair arbiter system 400 having input hold functions 410a, 410b and 410c and coupled by hold input signals and hold output signals, according to one embodiment. Hold functions 410a, 410b and 410c are additional inputs in each of the arbiter blocks 200a, 200b and 200c that go into the select decode element such as element 104 of FIG. 2. Additional logic is used in input-hold functions 410a, 410b and 410c that determine that the output (e.g., select-out 170c or 180c for arbiter block 200c) should be the same as it was in the last cycle for a certain number of clock cycles, as long as the input-hold signal is asserted.

The number of clock cycles may be implemented, in accordance with one embodiment, by use of a programmable counter. In another embodiment, an additional external circuit 430 that is external to device 200a, 200b or 200c might be used to determine a maximum time period for continuing to maintain access to the resource after a single arbitration cycle. Input-hold function 410a, 410b and 410c allows a winner of a cycle to maintain access to a resource for a period greater than a single cycle. Without the input-hold option, a winner of a cycle relinquishes access to another requestor at the next cycle in some embodiments, although the present invention is not so limited.

Still referring to FIG. 4, once hold-input 410a, 410b or 410c is asserted, it is useful to have collision detection logic so the winner is not forced to relinquish access to a resource after the maximum time has expired if there is no other requestor requesting access to the resource.

In one embodiment, the collision detection logic may be cascading hierarchically in a tree configuration, similar to that of the request-in and select-out logic of FIG. 3. Collision detection logic is asserted via collision output signals 445f, 445e, 445d, 445c, 445b and/or 445a that are generated by the logic block that detects a collision and input to the next parent and propagated up the tree. In one embodiment collision detection logic in external circuit 430 receives a signal 445 indicating a collision between any two nodes in the system and sends a hold-release input signal 435 that propagates down the tree via hold-release input signals 435a, 435b, 435c, 435d, 435e, 435f, as appropriate, to release the asserted hold on the resource. In another embodiment collision detection logic 430 may count the number of nodes that are currently requesting and, once the count exceeds a predefined number, may send a hold release signal 435c to release the asserted hold. Any appropriate method for detecting collisions within the hierarchical system may be employed.

Figure 5:
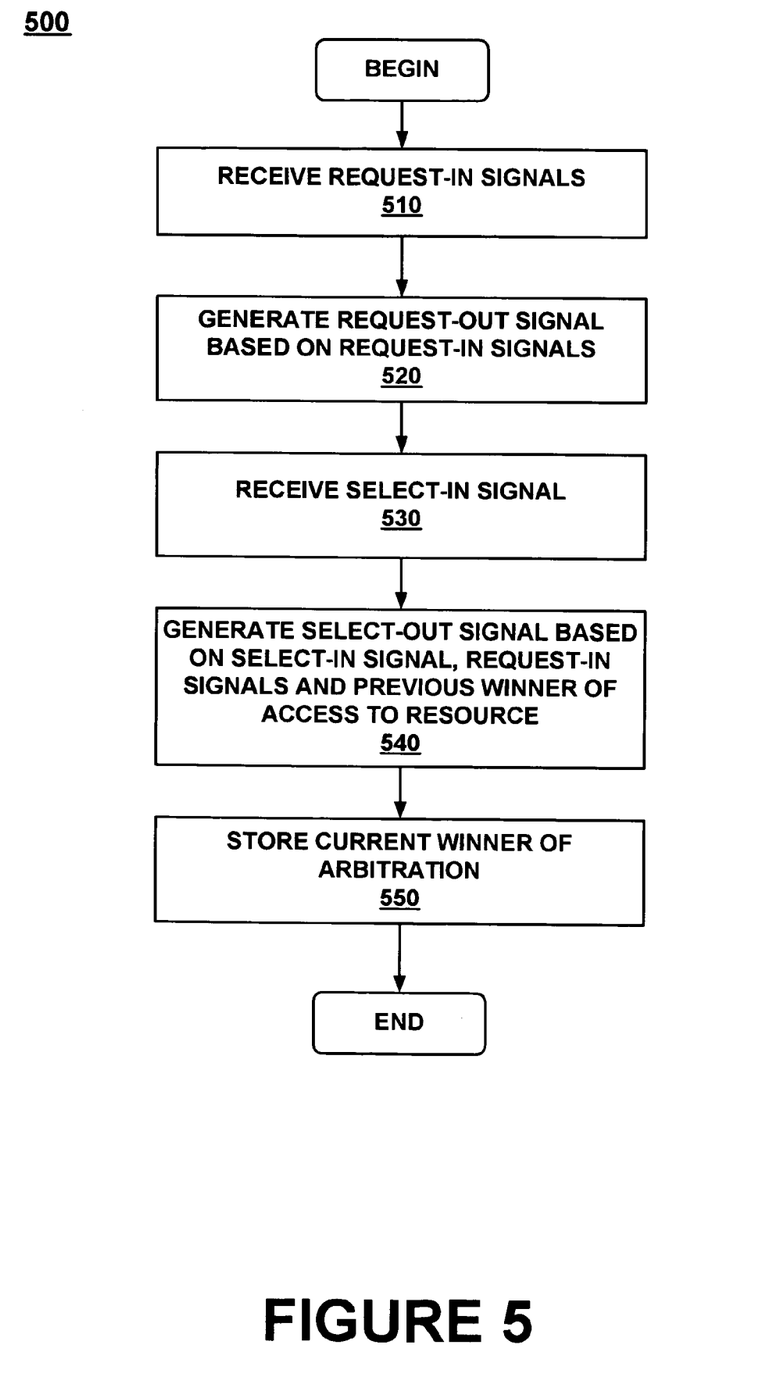
FIG. 5 is a flow diagram of a method for determining access to a resource by a hierarchical system of arbiter devices, according to one embodiment.

FIG. 5 is a flow diagram of a process 500 for determining access to a resource by a hierarchical system of arbiter devices, according to one embodiment. In a hierarchical system of arbiter devices (e.g., system 300 of FIG. 3), step 510 receives request-in signals (e.g., request-in 110c and 120c of FIG. 3) requesting access to a resource, such as a bus or a device coupled to a bus.

Step 520 of process 500 generates a request-out signal (e.g., request-out 130c of FIG. 3) based on having received request-in signals. If the request-out is generated by a child device (e.g., child device 200a in hierarchical system 300), the request-out becomes a request-in to its parent device. If the request-out is generated by an ultimate parent device (e.g., parent device 200c of FIG. 3) it becomes a select-in (e.g., select-in 140c).

Step 530 of process 500 receives a select-in signal. A child device will receive a select in from its parent. An ultimate parent will select itself. Then, step 540 generates a select-out signal based on the select-in signal, the previous winner of an arbitration cycle and the request-in signals.

In step 550, the winner of the current arbitration is stored for future use in arbitration selection. For example, the memory element is updated and used in step 540 in a future arbitration cycle.

This request and selection process is propagated up the hierarchy from the lowest child to the ultimate parent and then back down from the ultimate parent to the lowest child. When the select-out signal reaches the lowest child, access to a resource is granted and process 500 ends.

Although specific steps are disclosed in process 500, such steps are exemplary. That is, the present invention may be well suited to performing various other steps or variations of the steps recited in FIG. 5.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An arbitration system for granting access to a resource, comprising:
   a plurality of arbitration devices coupled in a hierarchy and comprising a plurality of child devices and at least one parent device;
   ones of said plurality of arbitration devices operable:
      to store a previous arbitration winner;
      to generate a request-out signal based on a plurality of request-in signals; and
      to generate a select-out signal using a select-in signal, said plurality of request-in signals, and said previous arbitration winner; wherein request-out signals of said plurality of child devices are coupled to request-in signals of their respective parent devices and select-in signals of said child devices are received from select-out signals of said respective parent devices, wherein said access is granted by a select-out signal from a device of said plurality of arbitration devices at a level of said system opposite that of said parent device, and wherein further an input-hold signal causes said access to be held for a predetermined number of clock cycles and said access is relinquished after said predetermined number of clock cycles has expired only if there is a pending request for access; and
   a collision detection circuit coupled to said plurality of arbitration devices, wherein a signal indicating a collision between said device and another of said child devices is propagated through said hierarchy to said collision detection circuit and wherein in response said collision detection circuit sends a signal that is propagated through said hierarchy to said device to release said access.

2. The arbitration system of claim 1 wherein said hierarchically coupled arbitration system is binarily expandable.

3. The arbitration system of claim 1 wherein said previous arbitration winner is stored in a D flip-flop.

4. The arbitration system of claim 1 wherein said resource is a bus.

5. The arbitration system of claim 1 wherein an ultimate parent device selects itself in response to a request-out signal.

6. The arbitration system of claim 1 wherein said ones of said plurality of arbitration devices each comprise:
   a first OR gate that receives a first request-in signal and a second request-in signal; and
   a first AND gate that receives said first request-in signal and said second request-in signal, said first OR gate outputting said request-out signal, said first AND gate outputting a signal to a second AND gate and a third AND gate, said second AND gate also receiving a signal identifying said previous arbitration winner, said third AND gate also receiving said first request-in signal, said second and third AND gates outputting signals to a second OR gate, said second OR gate outputting a signal that is received by a fourth AND gate and a fifth AND gate, said fourth and fifth AND gates also receiving said select-in signal;
   wherein said select-out signal is selected from an output of either said fourth AND gate or said fifth AND gate according to said signal identifying said previous winner.

7. A method for determining access to a resource by a hierarchical system of arbiter devices comprising:
   generating a request-out signal based on a plurality of request-in signals;
   receiving a select-in signal;
   generating a select-out signal from said select-in signal, said plurality of request-in signals and from a previous winner of access to said resource, wherein said previous winner is stored in said system, wherein said hierarchical system of arbiter devices is configurable to receive an input hold signal, said input hold signal causing a current winner of access to said resource to hold said access for a number of clock cycles, wherein further said access is relinquished after said number of clock cycles has expired only if there is a pending request for access;
   propagating a collision signal through said hierarchical system to a collision detection circuit to indicate a collision between said current winner and another of said arbiter devices; and
   propagating a release signal sent by said collision detection circuit in response to said collision signal through said hierarchical system to said current winner to release said access.

8. The method of claim 7, further comprising storing said current winner, which becomes said previous winner in a future arbitration cycle.

9. The method of claim 7 wherein said previous winner is stored in a D flip-flop.

10. The method of claim 7 wherein said resource is a bus.

11. The method of claim 7 wherein said hierarchical system of arbiter devices is binarily expandable.

12. The method of claim 7 wherein an arbiter device comprises:
   a first OR gate that receives a first request-in signal and a second request-in signal; and
   a first AND gate that receives said first request-in signal and said second request-in signal, said first OR gate outputting said request-out signal, said first AND gate outputting a signal to a second AND gate and a third AND gate, said second AND gate also receiving a signal identifying said previous arbitration winner, said third AND gate also receiving said first request-in signal, said second and third AND gates outputting signals to a second OR gate, said second OR gate outputting a signal that is received by a fourth AND gate and a fifth AND gate, said fourth and fifth AND gates also receiving said select-in signal;
   wherein said select-out signal is selected from an output of either said fourth AND gate or said fifth AND gate according to said signal identifying said previous arbitration winner.

13. A device for determining access to a resource, comprising:
   a memory operable to hold a previous winner of access to said resource;
   a first logic operable to generate a request-out signal based on a plurality of request-in signals; and a second logic coupled to said memory, said second logic operable to generate a select-out signal from a select-in signal, said plurality of request-in signals and from said previous winner received from said memory, wherein said device is operable to be used in a hierarchical arbitration system and wherein said device is configurable to receive an input hold signal, said input hold signal causing said device to hold said access for a number of clock cycles, wherein further said access is relinquished after said number of clock cycles has expired only if there is a pending request for access, wherein a signal indicating a collision between said device and another device of said hierarchical arbitration system is propagated through said hierarchical arbitration system to a collision detection circuit and wherein in response said collision detection circuit sends a signal that is propagated through said hierarchical arbitration system to said device to release said access.

14. The device of claim 13 wherein said second logic is further operable to provide a winner of a current cycle to said memory.

15. The device of claim 13 wherein said device is operable as an ultimate parent node by coupling said request-out signal to said request in signal.

16. The device of claim 13 wherein said hierarchical system is binarily expandable.

17. The device of claim 13 wherein said first logic comprises a first OR gate that receives a first request-in signal and a second request-in signal; and wherein said second logic comprises a first AND gate, a second AND gate, a third AND gate, a fourth AND gate, a fifth AND gate and a second OR gate; wherein said first AND gate receives said first request-in signal and said second request-in signal, said first OR gate outputting said request-out signal, said first AND gate outputting a signal to said second AND gate and said third AND gate, said second AND gate also receiving a signal from said memory identifying said previous winner, said third AND gate also receiving said first request-in signal, said second and third AND gates outputting signals to said second OR gate, said second OR gate outputting a signal that is received by said fourth AND gate and said fifth AND gate, said fourth and fifth AND gates also receiving said select-in signal; and wherein said select-out signal is selected from an output of either said fourth AND gate or said fifth AND gate according to said signal from said memory.

* * * * *